United States Patent [19]

Forkner

[11] 3,899,606

[45] Aug. 12, 1975

[54] PROCESS FOR THE TREATMENT OF COCONUT AND FOOD PRODUCTS RESULTING THEREFROM

[75] Inventor: John H. Forkner, Fresno, Calif.

[73] Assignee: The Pillsbury Company, Minneapolis, Minn.

[22] Filed: Mar. 20, 1974

[21] Appl. No.: 452,740

Related U.S. Application Data

[63] Continuation of Ser. No. 240,191, March 31, 1972, abandoned.

[52] U.S. Cl. ............... 426/250; 426/373; 426/459; 426/506
[51] Int. Cl.² ........................................ A23L 1/36
[58] Field of Search ........................... 426/205, 207

[56] References Cited
FOREIGN PATENTS OR APPLICATIONS
642,321   8/1950   United Kingdom................. 426/207

Primary Examiner—A. Louis Monacell
Assistant Examiner—J. M. Hunter
Attorney, Agent, or Firm—Flehr, Hohbach, Test, Albritton & Herbert

[57] ABSTRACT

A process for the treatment of coconut meat for the manufacture of new coconut and coconut-containing products. The coconut meat is subjected to controlled acid treatment whereby the meat is modified by disruption and reorientation of the cells. The process produces any one or more of several products as desired, including cell disrupted coconut in moist or dry forms. Also the cell disrupted material, may be in particulate (i.e., pieces) or comminuted (e.g. paste or powder) forms.

28 Claims, 17 Drawing Figures

PROCESS FOR THE TREATMENT OF COCONUT AND FOOD PRODUCTS RESULTING THEREFROM

CROSS-REFERENCE TO RELATED APPLICATIONS

This application is a continuation of application Ser. No. 240,191 filed Mar. 31, 1971 (now abandoned).

Reference is made to my copending application Ser. No. 173,106 filed Aug. 19, 1971, now U.S. Pat. No. 3,846,562 which is a continuation-in-part of my copending applications Ser. No. 74,310 filed Sept. 22, 1970 (now abandoned), and Ser. No. 866,452 filed Oct. 15, 1969 now U.S. Pat. No. 3,625,315, and to copending application Ser. Nos. 335,688 and 335,834, both filed Feb. 26, 1973, now U.S. Pat. Nos. 3,860,725 and 3,860,731 respectively.

BACKGROUND OF THE INVENTION

This invention relates generally to processes for the treatment of coconut meat, and to new food products resulting therefrom.

Coconut meat as used in various foods has been subject to a number of disadvantages. Particularly it has a fiber structure such that it is tough, whether in the form of fresh meat, dried or desiccated coconut, treated with sugar or sugar syrup or incorporated in other products. Thus it resists cutting when incorporated in products like cakes, cookies, confections and the like and is lacking in palatability. Shredding and flaking has been applied to obtain more usable physical forms, but this does not modify its inherent tough character, although the thickness of the flakes or shreds may be of the order of 0.05 inches. When finely divided as by milling it retains the same general characteristics, and in particular it does not impart stability and smoothness to mixes in which it is incorporated and it is lacking in absorptivity. Also the toughness remains after cooking by itself or in combination with other materials such as confectionary or bakery mixes. In general, these properties seriously limit application of commercial coconut products for confections or bakery uses.

One common form of readily available coconut meat is the so-called desiccated coconut. The meat may be in the form of dry shreds of strings having a thickness (minor dimension) ranging from 0.05 to 0.15 inches, and a length varying from ⅛ to 4 inches. Also it may be in the form of granules, with the bulk, of the particles less than 10 mesh and greater than 40 mesh in size, and commonly known as macaroon coconut. It is somewhat tougher than fresh coconut, presumably due to changes taking place during drying. Also it tends to resist absorption of various materials (e.g., sugar or sugar syrup.) When subdivided to finely divided form, it imparts a pronounced and unpleasant graininess to any food in which it is incorporated. Generally, such desiccated coconut contains all of the original fat content, although some fat may have been removed by pressing before drying. Such coconut tends to dominate over other material which which it is used, having reference particularly to graininess, flavor and general character.

Microscopic examination of fresh or desiccated forms of coconut reveals that the cells are rod-like and disposed in uniform parallel juxtaposition, with the coconut fat contained within the cells. Grinding serves to reduce the length of the cells but does not otherwise alter their form or relative positioning.

In my copending application Ser. No. 173,106, I have disclosed a process for the treatment of pieces of coconut meat which involves a step of fermentation. While this process is practical and can be used to advantage to produce tenderized pieces of coconut meat, it has certain disadvantages compared to the subject process. Particularly it involves extensive periods of fermentation of the order of two days or more. It imparts characteristic odors and flavors to the product which are generally objectionable, and special processing must be applied if these odors and flavors are to be reduced to acceptable levels. By product liquors produced as a result of fermentation likewise have a noticeable yeast odor and flavor, and therefore present a waste disposal problem. It has been found desirable to remove a substantial amount of oil in the source material before fermentation, thus complicating the process and necessitating centrifuge equipment for oil separation. In addition to the foregoing, yeast fermentation treatment is relatively expensive compared to the simpler subject process, and according to my observations the products obtained do not have certain of the properties obtained by the present process.

SUMMARY OF THE INVENTION

In general it is an object of the present invention to provide a process for the treatment of coconut meat which will serve to convert the meat into new products characterized by relative tenderness and modified characteristics.

Another object of the invention is to provide a process which modifies the material of coconut meat to reduce its toughness, and which in addition increases the ability of the coconut meat to absorb other materials such as flavors, sugar or sugar syrup, hydrolysed starch products, fats, gums, milk solids, fruit juices and the like.

Another object of the invention is to provide a coconut treatment process which is relatively simple and inexpensive to carry out in commercial practice.

Another object of the invention is to provide a process for treating coconut meat which imparts new properties and makes possible incorporation with a variety of other materials to produce a great number of novel final products. Particularly the process provides greatly increased absorptivity, which is attributed to cell disruption and a loosening of cells with respect to each other.

Another object of the invention is to provide a process for treating coconut meat which produces a material in finely divided form that is useful for blending with other edible material.

Another object of the invention is to provide a process applicable to coconut meat which can be controlled to obtain certain desired properties in the final products (e.g., different degrees of tenderness or cell disruption).

Another object of the invention is to provide novel coconut products which have wide usefulness in the food industry, including uses where present coconut products are not applicable.

Another object is to provide a coconut material having high absorptivity with respect to water and oils, and which is readily penetrated by sugar syrup or other materials, and which in particulate form is tender without graininess.

Another object is to provide novel coconut products which when in hydrated or moist forms can be readily cut (e.g. by the cutting mechanism of a cooky depositor or the wire cutter of a dough subdivider), thus providing an edible material which is well adapted for use in food products such as cakes, cookies, confections and the like.

Another object is to provide dry coconut meat products in particulate or finely divided form which are readily rehydrated when contacted with water or water-containing mixes. The finely divided products function as creaming and thickening agents when incorporated in a wide variety of food products.

Another object of the invention is to provide a finely divided material derived from a coconut meat which when blended with other materials does not impart graininess, but does function as a stabilizer and imparts smoothness.

In general, the present process includes treatment of coconut meat at an elevated temperature in an aqueous solution of a physiologically acceptable acid. The acid treatment acts upon the coconut in such a manner that cells are disrupted and caused to be oriented in a random fashion to an extent depending upon control of processing factors, whereby the material becomes relatively tender and more susceptible to absorption of various substances. The tenderized coconut may then be treated to neutralize residual acid, after which it may be used in moist form or may be dried by conventional methods. In certain embodiments the treated coconut is impregnated with sugar or sugar containing materials to form a tenderized and sugar-impregnated product. In other embodiments the treated coconut is incorporated with various additives. Some of the coconut fat may be removed before and/or after such acid treatment.

Additional objects and features of the invention will appear from the following description in which the preferred embodiments have been set forth in detail in conjunction with the accompanying drawing.

DESCRIPTION OF THE PREFERRED EMBODIMENTS

In general, the present invention involves treatment steps including subjecting the coconut to the action of an acid solution at an elevated temperature. The source material may be one of the various forms of commercially available coconut meat, including peeled or unpeeled fresh coconut, desiccated coconut of the macaroon, short shred, conventional shredded and string types, copra or copra meal that has been partially defatted. Assuming that the source material employed is desiccated shredded or string coconut, the pieces of meat may range in thickness from about 0.05 to 0.15 inches, and in length from 0.8 to 4 inches. In some instances, the length of coconut strings may exceed 4 inches. Such dried coconut is readily available and generally retains its original fat content.

A typical analysis of desiccated coconut is as follows:

| | |
|---|---|
| Moisture | 3.5% |
| Fat | 64.9% |
| Protein | 7.2% |
| Fiber | 3.9% |
| Carbohydrate other than fiber | 19.1% |
| Ash | 1.4% |
| | 100.00% |

Figure 1:
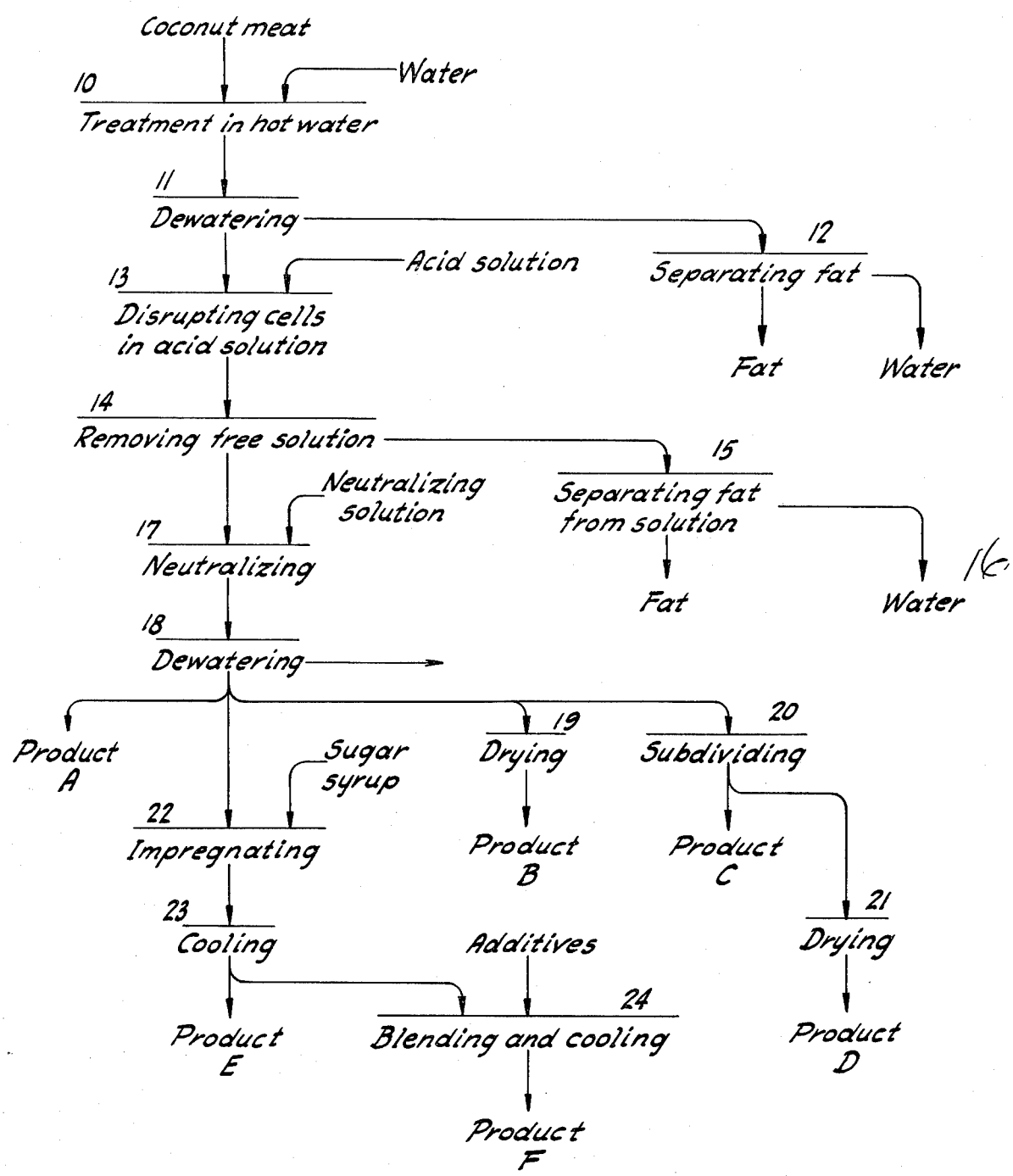
FIG. 1 is a flow diagram showing one procedure for practicing the invention.

In the embodiment of FIG. 1, the source material is shown being subjected to pretreatment 10 which may serve to release some free fat that it not encapsulated in the coconut cells, and in the case of dried or desiccated coconut also serves to rehydrate the meat. It can be carried out by immersing the desiccated coconut in hot water at a temperature above the melting point of the fat (e.g. 85° – 212°F.). In practice good results are obtained by introducing desiccated coconut into boiling water and continuing boiling for a period of about 15 minutes. Assuming that the desiccated coconut has not been previously treated for removal of a part of its fat content, this pretreatment serves to release some free fat (e.g., 22 lbs. of fat per 100 lbs. of original shredded coconut) and some protein and other soluble constituents (e.g. sugar).

The period of treatment in hot water may vary somewhat depending upon the size of the coconut particles. Thus, treatment of desiccated coconut may extend over periods of the order of from 5 to 60 minutes for different particle sizes. Instead of boiling in water at atmospheric pressure, this step can be carried out in a pressure vessel to obtain higher treatment temperatures (e.g. 215°–230°F.), thus shortening the time required.

Following step 10 of FIG. 1, the material shown is being subjected to dewatering in step 11 for the purpose of removing the major part of the free water and the released oil. This step can be carried out by conventional methods such as draining, filtering, centrifuging, pressing or combinations of such methods. The removed liquor is being shown subjected to a separating operation 12 such as centrifuging for the separation of fat and water fractions. As previously mentioned, this fat can be used as a saleable byproduct, or all or a portion of this fat can be incorporated with various products made by the process. The water fraction from the separating operation 12 contains some solubles dissolved in step 10, particularly sugars and protein. To effect some further removal of solubles, the dewatered material may be subjected to washing with fresh water.

As will be presently explained, in some instances it is desirable to leave the fat and other released constituents (e.g. protein, sugar and other solubles) with the batch being treated, in which event steps 10, 11 and 12 are omitted.

The moist material is shown being subjected to cell disrupting treatment in step 13. This is carried out by mixing the dewatered material from step 11 with water which has been acidified. A simple inorganic acid can be used such as hydrochloric, and in typical instances the acid concentration may range from about 0.13 to 2% to provide a hydrogen ion concentration of from pH 2 to 0.57. The acid can be added to the water either before or immediately after the water has been mixed with the coconut meat. The batch is maintained at an elevated temperature which in typical instances may range from about 180° to 212°F. If carried out under pressure greater than atmospheric, the temperature may range up to about 250°F.

While hydrochloric acid has been found to be effective, any other physiologically acceptable inorganic acid like sulfuric or phosphoric can be used, providing that they do not injure the coconut or cause objectionable residues that are difficult to remove. Organic acids like lactic, tartaric, citric, malic and fumaric have been found to be mildly effective but they are not deemed desirable because of the relatively large amount of acid required and the extended treatment times involved.

The time required for step 13 (for a given acid concentration) depends upon the amount of tenderizing or cell disruption required. Also it ranges inversely with the treatment temperature. For temperatures ranging from 180° to 212°F., the amount of time required for a reasonable amount of tenderizing will vary inversely from about 60 to 5 minutes.

One simple procedure which has been used with good results, using 1% hydrochloric acid solution, is to heat the acidified water to boiling or near boiling temperature, after which the dewatered shredded moist coconut is added and the batch heated back to boiling temperature and held at that temperature for a period of about 10 minutes.

After the tenderizing treatment 13, the batch of material may be subjected to dewatering in step 14 which removes a substantial amount of the free liquid, after which the moist dewatered material is shown being contacted with a neutralizing solution in step 17 to neutralize the residual acid content. A dilute solution of sodium carbonate or sodium bicarbonate is effective for this purpose. The final pH of the liquid of the batch can be of the order of 5 to 6.5. Following step 17 the material may be subjected to dewatering in step 18 to produce a moist shredded and tenderized coconut meat indicated as product A.

In instances where it is desired to produce dry particles of the tenderized coconut meat, the dewatered moist material from step 18 is subjected to drying 19 to produce the dry product B.

The moist material from step 18 can also be subjected to subdividing in step 20 as by use of a hammermill or other types of grinding or milling equipment to produce the product C. The size of the particles in product C will depend upon the type of grinding employed, and the purposes for which the product is to be used. A dry discrete material can be obtained by drying 21 (e.g. spray drying) the moist product C, thereby producing the discrete dry product D. Because of the tenderized or cell disrupted character of the material resulting from step 12, it can be readily disintegrated or milled to finely divided form.

As previously indicated, the dewatering operations 11, 14 and 18 referred to above can be carried out with various types of conventional equipment. A substantial amount of free liquid can be removed from the moist material simply by draining upon a screen. However, more free water or solution can be removed by use of a centrifuge of the basket type, by continuous or batch filters, or by the use of filter presses of the feedscrew type. The moist cake resulting from such dewatering operations can be readily subdivided and mixed with water for washing. Liquid removed in such operations can be discarded or concentrated by evaporation and returned to the process, with or without refining.

Although the products produced as described above are suitable for many purposes, further desirable products can be obtained by impregnating the tenderized coconut meat with various edible materials, including sugar or sugar syrup. Thus in step 22 the material from the dewatering step 18 is subjected to sugar syrup impregnation whereby various useful products are obtained. Generally this impregnating step is carried out at an elevated temperature at or near the boiling point of the syrup (e.g., 215°–265°F., optimum range 225°–250°F.) Sugar syrup can be added in step 22 to attain a syrup concentration of about 50 Brix, after dilution with the water associated with the coconut. After the syrup is mixed with the moist coconut meat, the temperature of the syrup is raised to boiling point. Thereafter evaporation can be continued over a period of time whereby at the end of the impregnation step the syrup is at the concentration desired (e.g. 70 to 85 Brix).

The nature of the impregnating step 22 can be such that it starts with a dilute syrup (e.g. 40 – 50 Brix) and proceeds with increasing concentration to a final concentration of the order of 80 to 85 Brix.

While it is generally desirable to carry out the impregnating step 22 at atmospheric pressure and to temperatures of the order specified above, it is possible to carry out impregnation and evaporation at lower temperature levels and under partial vacuum, particularly when it is desired to retain the natural white color of the coconut.

Impregnation can be carried out in a suitable vessel or kettle equipped with heating and agitating means whereby the mass of syrup and coconut shreds can be heated to boiling temperature and held at boiling temperature over a period of impregnation. The temperature at the beginning of the impregnation step depends upon the concentration of the syrup used. Thus when the syrup is initially at about 50 Brix and is at about 80 Brix at the end of the impregnation operation, the temperature in the kettle may range from about 215°F. at the beginning of impregnation to about 230° to 265°F. at the end of impregnation. The time period of impregnation may vary from about 15 minutes to 2 hours. In general, impregnation can be continued until the sugar syrup has effectively penetrated the interior of the meat with the moisture content of the coconut meat being equalized with the moisture content of the syrup. Impregnation can be continued whereby the syrup concentration attained is suitable for the purposes for which the impregnated product is to be used.

The impregnating step 22 is accompanied by removal of a substantial amount of moisture from the coconut meat, as for example, from 25 to 50% of the initial moisture content as supplied to the step 22. In some instances, as much as 95% of the moisture can be removed from the coconut, as for example when penetration is continued to obtain concentrations of the order of 90 – 95 Brix to provide a brittle product which can be fractured to particulate form.

While FIG. 1 indicates impregnation with sugar syrup, other edible impregnating materials can be used as will be presently explained.

Following impregnation the material can be cooled in step 23 to produce product E. Immediately before cooling some of the free syrup may be removed from the coconut meat whereby product E is in the form of tenderized shredded coconut pieces which are sugar impregnated. Some additional free syrup can be removed by washing the impregnated shreds with hot water after removal of free syrup.

A variety of blended products can be made by adding various food materials to the impregnated coconut from step 22. Thus edible additives are shown being supplied in step 24 to produce the blended product F. A wide variety of additives can be used for this purpose, including such materials as jams, marmalades, preserved fruit, cheese, tomato paste, stabilized meat soup stock, spices, milk solids, chocolate flavoring and colorings. Such additives may also be supplied to the impregnating step 22. Material from step 22 can also be subdivided as by milling before or during blending in step 24.

As previously indicated, it is possible to apply the process to fresh coconut meat as well as coconut of the desiccated types. Thus, fresh coconut can be prepared in the form of dices having a thickness of the order of one-eighth to five-eighths inch. The treatment of such dices can be substantially as described above, care being taken however to process material in such fashion as to avoid its mechanical disintegration. The fresh coconut is not hydrated in step 10 but some free fat and solubles are removed. Assuming the removal of excess syrup after impregnation, the product F consists of sugar impregnated tenderized coconut meat dices.

Coconut pastes suitable for making such products as jams, jellies, confections, macaroons and the like can be obtained by blending the finely divided dry product D with a suitable amount of hot sugar syrup. In such event, there is substantially complete dispersion of the disrupted cell fiber in the syrup, in a relatively short time. Such paste may also be prepared by grinding a product like product E until it is in the form of a paste of the desired consistency.

Reference has been made to the fact that in the present process pieces or particulates of the coconut are not only tenderized so that eating properties are greatly improved, but in addition the meat is made more absorptive or receptive to the absorption or sorption of various materials. The increased sorptive property is utilized in the impregnating step 22 to obtain effective impregnation with the sugar syrup. This property is obtained in step 13 by disruption of cells as will be presently described. The subdivided moist product C or the dry discrete product D serves as an effective stabilizing and thickening agent when added to various materials such as gel-like desserts, frozen desserts, soup stock and materials that contain edible fats, fats dispersed in water or water-fat emulsions. Assuming that the soup stock to which the coconut material is added contains a fat together with water, the tenderized coconut meat appears to absorb a substantial amount of fat. Thus when a hot soup is made from a soup stock containing a subdivided coconut meat product made by the present process, the fat content is more effectively dispersed, and the soup appears to be thicker because of the presence of the cell disrupted coconut fiber, and such thickening can be produced without conventional gelling or the use of conventional gelling agents.

The sorptive properties of the tenderized coconut are also utilized in such products as pastes and jams. As previously indicated, pastes can be made by blending the dry material product D with a proper amount of sugar syrup. The particles by virtue of this absorptive action function to thicken and stabilize the paste. When such a paste is dispersed in a jam, the resulting product has a body or consistency which is modified by the presence of the coconut particles, and the product is stabilized in such a manner that it withstands baking heat without liquifying. In effect, such products are thickened without gelling, and when heated do not form a paste or crumb.

As previously mentioned, the fat removed in step 12 is of good quality and suitable for reincorporation in final products. For example, some of such fat, with or without other fats or supplements, can be incorporated in coconut paste made as previously described.

In instances where the impregnating step 22 is carried out in such a manner that a high syrup concentration is attained (e.g. 90 to 95 Brix), the resulting material when cooled is relatively brittle and can be subdivided into hard fragments to form a discrete material. When such a discrete material is reheated to soften the same and subjected to a partial vacuum, it is expanded to form an expanded or cellular product.

As previously mentioned, various flavoring components or extracts can be added to the products. For example, flavoring or coloring can be added to the dewatered material from step 18 whereby the various end products are flavored and/or colored. Products E and F can be flavored by introducing flavoring material into the syrup used in step 22, or such flavoring can be added at the end of step 22. Various colorings can be added while the coconut material is in a wet state. It is also possible to limit the time exposure of particles to a coloring medium whereby only the exterior layers are colored, leaving the inner cores in contrast (e.g. brown exterior layer and near white or honey-colored central core).

The drying operations referred to above can be carried out by any one of several known methods, including rotary drum drying or spray drying a slurry of the comminuted material. For drying larger particles or pieces, one may employ sun drying, tunnel or tray dryers in which the product is contacted with hot drying gas, vacuum drying in which the product is dried in a partial vacuum, or freeze drying in which the frozen material is dried under vacuum.

Assuming that no added coloring is used, the color of the processed coconut is white or a light golden color. If a darker tan or brown is desired, the amount of alkali (e.g. sodium bicarbonate) used for neutralizing can be increased to raise the pH (e.g. to 6.6 – 8.0) and heat applied (e.g. to 212°F.) until the desired shade is obtained. Also color can be imparted by more or less caramelization of re-used impregnating sugar.

The process results in some modification of the natural coconut flavor. Some coconut flavor is retained, but it is relatively mild compared to natural coconut. A relatively sweet flavor is imparted by sugar impregnation, a toasted flavor can be imparted by browning at high temperatures, or a caramel flavor by heat treatment to caramelize the syrup content and darken the coconut. Also the flavor can be modified by various flavoring additives as previously described. There is a complete absence of the objectionable toughness characteristic of conventional coconut meat, and in contrast, the meat particles are relatively tender due to disruption and reorientation of the cells during the acid treatment. Assuming that the product is colored in one of the manners described above, the coloring penetrates the interiors of the particles whereby their color throughout is relatively bright, uniform and stable compared to opaque colored coconut flakes or shreds such as have been produced in the past. This is attributed to the fact that the tenderizing treatment modifies the coconut in such a manner that color quickly penetrates into the interior of the particles, whereas normal coconut meat tends to resist color penetration. Tenderized coconut dices produced by the present process can be colored in the same manner as coconut shreds, although a slightly longer time is required for complete color penetration or partial penetration.

When fresh coconut meat is the source material, and final tenderized coconut in piece form is desired, care should be taken to avoid disintegration during processing. Thus, the tenderized treatment is terminated before any substantial disintegration takes place. Also care is taken in the handling of the material and in the dewatering operations to avoid mechanical disintegration.

Instead of conventional dicing or shredding, fresh coconut may be subdivided into chunks the size of nut kernels or kernel pieces. In such event, the tenderizing action progresses inwardly from the outer surfaces of the pieces and can be terminated to provide pieces which have cores that are harder than the outer layers. In effect, the cells of the outer layers are more completely disrupted whereas the cells of the inner portion may be unaffected or disrupted to only a minor extent. Such pieces can subsequently be partially impregnated with sugar syrup and further processed to produce dry pieces which are nut-like in character. The use of filter presses should be avoided if it is desired to retain the initial physical identity of such pieces.

In the foregoing a number of controllable factors have been mentioned in connection with the acid treatment step. In general these factors are the hydrogen ion concentration (i.e., pH) of the acid solution, the treatment temperature, the time period of treatment, the physical size of the coconut particles and the maturity of the source coconut. As previously mentioned, the disruption of the cells proceeds at a rate which increases with a lowering of the pH and an increase in the treatment temperature. The extent to which disruption and reorientation of cells takes place is also directly related to the time period of treatment. The larger pieces of coconut meat require more extended treatment to complete a desired amount of cell disruption in the interiors of the masses. The more mature coconut meat (i.e., coconuts that have attained a greater degree of maturity before harvesting) tends to require less extended treatment than meat from less mature coconuts.

In general, the products produced by the above described process can be used for a variety of purposes. For example, the moist product A comprises tender coconut particles (e.g. shreds) which can be incorporated in a variety of bakery products. When so used, they are not materially modified during baking, and in the baked products in which they are incorporated they can be readily severed when the bakery product is sliced. They also have excellent natural flavor, although they are compatible with added natural or artificial flavors. The latter can be added for flavor enhancement or to an extent sufficient to mask over the natural flavor of the particles. Product A can be incorporated in icings and confection mixes.

The dry product B can also likewise be used for the same purposes as the product A. When incorporated in moist doughs or other mixes, the particles readily absorb water to attain a moisture content consistent with the surrounding mix.

The subdivided moist product C can likewise be used for the same purposes as product A, except that finely divided particles are dispersed in such a manner that they are not separately identifiable. The same applies to the dry discrete product D. Such products do not impart graininess when blended with various other materials. On the contrary, they impart stability and smoothness.

Products E and F are representative of products impregnated with sugar. Product F is in the form of a homogeneous jam or paste. Such paste may be relatively viscous or comparatively fluid. Some large coconut particles may be included. A characteristic of such viscous pastes and jams is that when used as a filling for bakery products they do not tend to liquify during baking and therefore do not spread in the baking process. Also such a filling does not tend to burn in the oven or stick to contacting metal surfaces, even though surfaces of the filling may be directly exposed to the oven heat during baking, or in direct contact with hot surfaces of the baking pan. When such a paste or jam is incorporated with or in contact with unbaked dough, the moisture does not tend to migrate from the jam to the dough, thus permitting storage for long periods under refrigeration or in frozen condition. Compared to conventional coconut, the tenderized or cell disrupted coconut will rapidly absorb a greater amount of syrup, thus making possible bakery products with dispersed discrete particulates of fiber bound syrup. Such syrup content inhibits dehydration and syneresis and thus tends to increase the shelf life of bakery products in which it is incorporated. When used in confections it serves as a stabilizer and imparts chewiness and a smooth mouth feel. Also it makes possible a higher moisture content in the confection and inhibits outward moisture migration or development of objectionable hygroscopicity. In certain confections, like those which are expanded by vacuum, the tenderized coconut when present in finely divided discrete form acts as an absorbent to reduce tendency of sugar to liquify due to hygroscopicity and to sustain piece retention in moist food products. My coconut paste product can be used with other ingredients to make a macaroon dough or mix, such as is employed for the manufacture of bakery macaroons. When used as fillings or as masses incorporated in doughs or other food products, the coconut paste does not dominate the other ingredients with respect to flavor, appearance or consistency. Also it does not tend to disintegrate and become indistinguishable from the surrounding dough and the color of the contained syrup does not bleed into the dough, thereby causing the dough to become soggy or streaked.

Products made by drying the impregnated material from step 22, after removal of any excess surface syrup may be consumed as such, or may be incorporated in moist dough or moist mixes whereby they are caused to partially rehydrate by moisture absorption. Also such coconut particles may be first rehydrated by contact with water and then introduced into dough. After baking, the particles form islands of a moisture content that is stable and independent of changes in the moisture content of the cooked dough. Dough containing such particles can be subjected to normal baking without deterioration. When the pieces are exposed on dough surfaces during baking, they are not subject to burning or sticking to the pan. They can be readily severed by a knife or conventional cutting devices after being incorporated in uncooked dough and after the dough has been cooked by baking. For example, in instances where natural nuts tend to pull out or to be dislodged from the baked dough, substitution of my tenderized or cell disrupted coconut particles will produce a cake which can be sliced without such dislodgement or pulling out from the dough.

With respect to products that are finely subdivided after treatment to effect cell disruption, the smaller particles retain absorptivity, and when such material in discrete form is incorporated in a moist or hydrous mix, a substantial amount of the moisture is absorbed by the particles, thus thickening and stabilizing the mix. When the mix is one containing a high percentage of sugar or sugar syrup (e.g., jam), the cell disrupted coconut particles absorb both moisture and sugar whereby the jam is thickened and stabilized. Likewise, when the cell disrupted particles are mixed with a material like natural or processed cheese or tomato puree, there is a noticeable thickening and stabilizing effect. Absorptivity is effective with respect to oils or fats, with or without water. Thus the dry discrete product D can be dispersed in a soup stock containing water, fat and meat extract, with the result that the stock is thickened and stabilized, and hot soup made from such stock is thicker and more palatable. The cell disrupted coconut particles in such a mix absorb both fat and moisture whereby fat is dispersed together with the particles. Such discrete material can also be used in various doughs and batters, either as a homogeneously intermixed additive, or added after combining with materials like sugar syrup to provide fillings or jams that retain their identity in doughs and baked products. In all of the uses described above, the coconut particles are of such tender consistency that they do not impart graininess.

Figure 2:
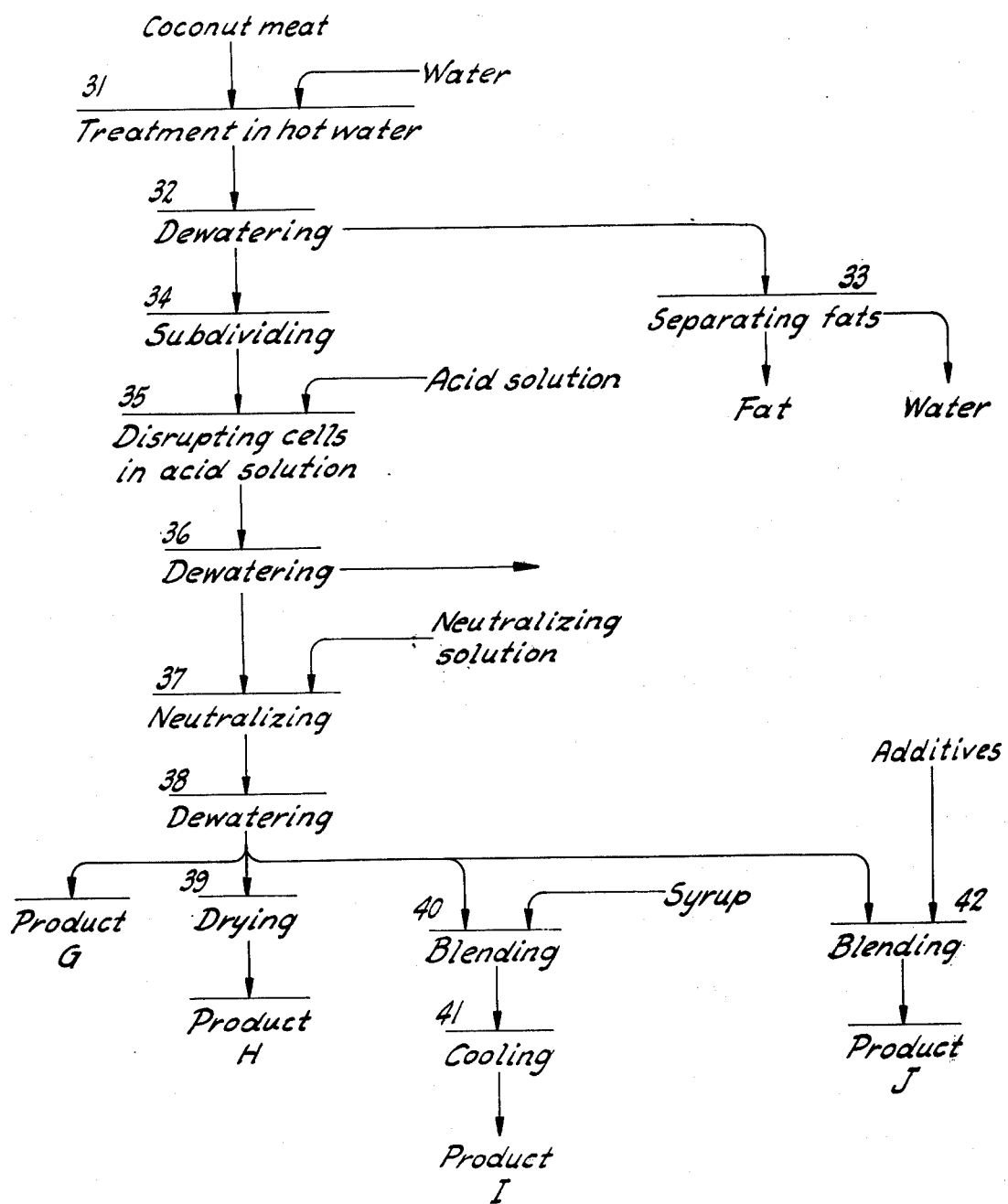
FIG. 2 is a flow diagram illustrating another embodiment.

The process illustrated in FIG. 1 carries out the tenderizing or cell disrupting operation 15 with the coconut meat in the form of particles or pieces of discernible size (e.g. macaroon shreds, strings or dices). In the embodiment of FIG. 2 the material leaving the tenderizing step is finely divided. Assuming that the source material for FIG. 2 is dry shredded coconut, it is shown being rehydrated with hot water in step 31 followed by dewatering in step 32 and separation of the effluent in step 33 to provide fat and water fractions. This may be followed by further washing and dewatering. After step 32 the material may be subdivided in step 34 as by use of a disintegrator of the hammer mill type to form a slurry in which the coconut particles are granules. As will be presently explained, this step can be omitted under certain conditions.

The tenderizing or cell disrupting step 35 is carried out in the same manner as in step 13 of FIG. 1. Step 35 is extended to cause the pieces of coconut to be disintegrated to the form of finely divided solids. Application of preliminary disintegration in step 33 makes possible some shortening of the time period for disintegration in step 35, but may be omitted as previously mentioned.

The material from step 35 is in the form of a slurry. It may be subjected to dewatering 36 as by use of a suitable filter or centrifuge of the continuous type. The acid content of the dewatered material may be neutralized in step 37, the same as in FIG. 1, and again dewatered in step 38, to remove some of the resulting salt. This material, which is in the form of a smooth paste or puree, may be used as product G, or it may be dried in step 39 to form the dry discrete product H. Also it may be blended and incorporated with hot sugar syrup in step 40 followed by cooling 41 to produce product I. Another part of the material from step 38 may be blended in step 42 with edible additives like cheese or tomato solids to produce product J.

The process of FIG. 2 facilitates the production of coconut solids in finely divided form. Also it creates the properties desired, including the ability to impart smoothness and stability when blended with other materials, absence of undesirable graininess, good absorptivity with respect to water, sugar syrup and fat, a mild flavor that does not dominate when associated with other flavors, and the ability to lend viscosity and to stabilize various materials to which it is added.

While the procedure of FIG. 2 removes fat before treatment in step 35, it is possible to omit steps 32 and 33 and to remove fat only in step 36. In such event, the source material may be introduced directly into the acid solution.

Figure 3:
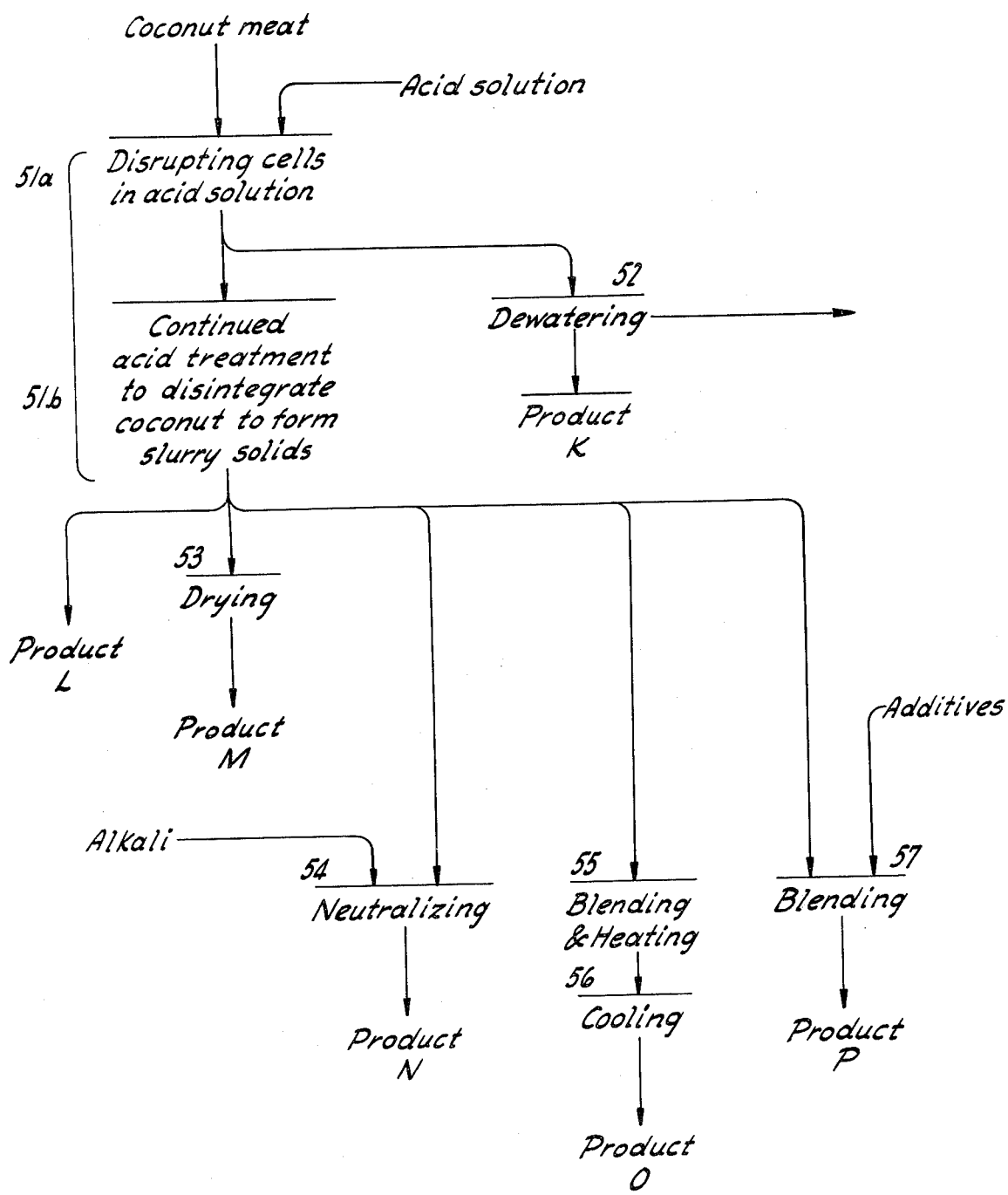
FIG. 3 is a flow diagram illustrating another simplified embodiment.

In some instances all of the oil content, protein and other solubles of the source material may remain and be incorporated in the final products. Thus as shown in FIG. 3, dry shredded coconut is rehydrated in hot acid solution in step 51a, and the entire batch then tenderized in step 51b. Both steps 51a and 51b can be carried out in the same equipment and as one continuous operation, in which event hydration and cell disruption proceed simultaneously but with hydration being completed before termination of cell disruption. Step 51b can be extended under such conditions of acidity and temperature as to cause the shreds to be disintegrated to form the slurry product L which contains water, fat, protein and all of the other coconut ingredients. The slurry can be dried in the step 53 to produce the dry product M. Also the slurry can be neutralized in step 54 by adding an alkali to form product N, or neutralizing can be omitted if some acid is not objectionable. The moist slurry solids may be blended with sugar in step 55 at an elevated temperature (e.g. 220° to 240°F.) followed by cooling 56 to produce the sugar-containing paste-like product O. Step 57 represents blending with other additives such as tomato, cheese, or milk solids to produce the product P. Also the slurry from 54 may be dried.

Assuming that steps 51a and 51b are carried out separately, tenderized material (but not physically disintegrated material) from step 51a can be dewatered at 52, with or without neutralizing, to produce product K.

The shredded coconut used for the source material in the procedure of FIG. 3 may be subdivided to discrete form, as by use of a hammer mill or dicer. Also the source material may be fresh coconut meat that is shredded, diced or otherwise subdivided.

In general, and assuming that the presence of the original oil content is permissible or even desirable, it is considered preferable to use the process of FIG. 3 in place of the processes of FIGS. 1 and 2 for producing a product containing cell disrupted coconut solids in finely divided form. As will be presently explained, in carrying out the acid treatment to the point of disintegrating the coconut solids, all or substantially all of the cells of the coconut are disrupted, and the resulting particles comprising fragments of cellulosic fiber impart distinctive properties to the products. For example, with a relatively small amount of agitation product S assumes a creamy consistency with the fat content being dispersed and with the oil-water dispersion being stabilized by the disrupted cells. If it is desired to somewhat reduce the fat content of the final products, some water and oil can be removed immediately following the step 51b.

Both the fat and aqueous fractions removed in pretreatment (e.g. in step 11 of FIG. 1) contain coconut flavoring which is not affected by the subsequent acid treatment. Such material (e.g. removed fat and/or aqueous fraction) when reintroduced into the coconut after the acid treatment imparts the coconut flavor of the source coconut. Likewise, the coconut milk from fresh coconut can be used for the same purpose.

FIGS. 5 – 14 are reproductions of photomicrographs showing various coconut samples. The original photomicrographs were taken on 1 by 1 ½ inch colored slides at 63 times magnification and with polarized light. Black and white negatives were made from the slides, the negatives being three times enlargements of the slide images. Black and white prints were then made of the negative, each black and white reproduction being a magnification of about 189 times.

Figure 5:
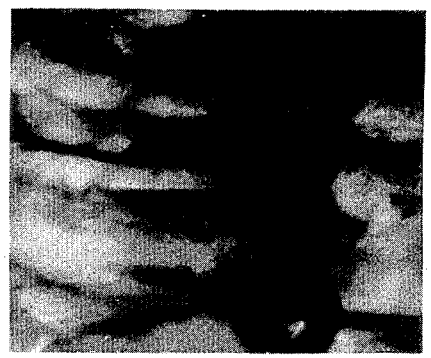

FIG. 5 shows a longitudinal section of fresh coconut meat. It illustrates the elongated uniform cell structure, with the cells being aligned and parallel in compact rows in cell bundles. These cells normally contain fat and water, although a small amount of fat may be exterior of the cells.

Figure 6:
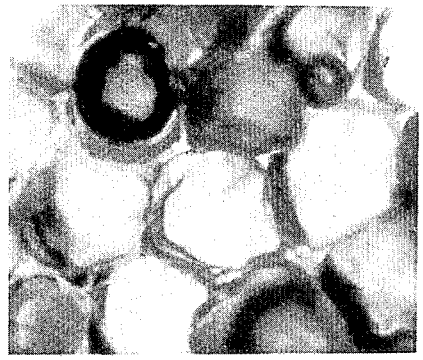
FIGS. 5 – 14 are photomicrographs showing coconut meat before and after processing.

FIG. 6 shows a cross-section of fresh coconut meat. It illustrates definite and strong cell walls containing fat and water and in closely packed relationship with each other.

Figure 7:

FIG. 7 shows a sample of fresh coconut after boiling in water for 15 minutes at 212°F. The cell structure is shown to be intact and essentially the same as in FIG. 5. There is some evidence of free water bubbles on the surfaces of the cells.

Figure 8:
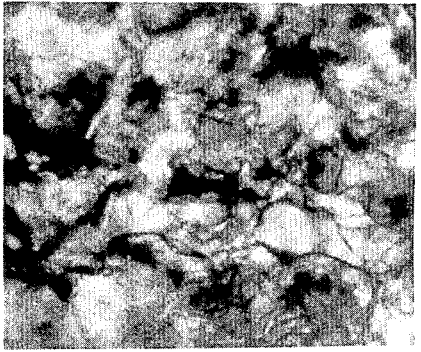

FIG. 8 shows a sample of fresh coconut after boiling in 0.5% hydrochloric acid solution for a period of 30 minutes. It shows disrupted cells with a portion of the fat released. Also it shows that the cells no longer have the close compact relationship shown in FIG. 5. The cells are not only disrupted, but they have been reoriented with respect to their relative positioning to form a loose mass into which material can be absorbed into and about the disrupted cells.

Figure 9:
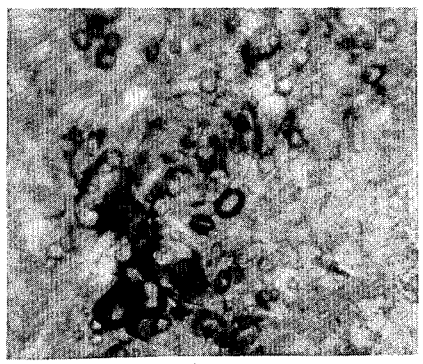

FIG. 9 shows fresh coconut after it has been boiled in 1.0% hydrochloric acid solution for a period of 90 minutes. It shows that the cells have been disrupted to a greater degree than in FIG. 8, due to the lower pH of the treatment solution. Also it shows the reorientation and loose relationship between the disrupted cells to provide good absorptivity.

Figure 10:
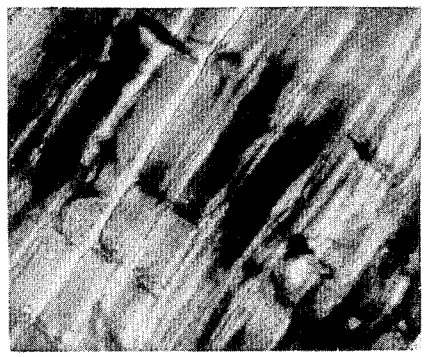

FIG. 10 shows a sample of desiccated coconut after being boiled in water for a period of 15 minutes. A dye was added to the water to accentuate the image detail. It shows that the cells are not disrupted and that they are elongated in form and uniformly aligned in a manner similar to FIG. 5. They do not appear to be as full of fat and water as the fresh coconut cells shown in FIG. 5.

Figure 11:

FIG. 11 shows a sample of desiccated coconut after being boiled in 0.5% hydrochloric acid solution at 212°F. for 15 minutes with dye added to the solution. It shows cells that are partially disrupted and oriented, and reveals that a portion of the fat has been released from the cells.

Figure 12:
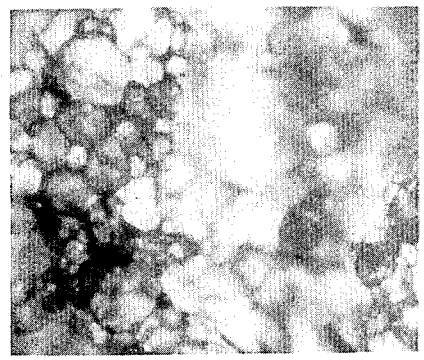

FIG. 12 shows a sample of desiccated coconut after having been boiled in 1.0% hydrochloric acid solution. It shows cells that are more completely disrupted than the cells of FIG. 11. The more complete disruption of the cells is attributed to the lower pH of the solution.

Figure 13:
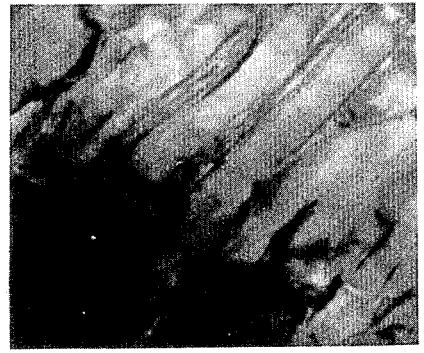

FIG. 13 shows a sample of desiccated coconut after boiling in water for 15 minutes and then grinding. It shows that grinding chopped the longitudinal dimensions of the cells but did not disrupt the cell walls in the same manner as the treatment in the acid solution.

Figure 14:

FIG. 14 shows desiccated coconut after boiling in 0.5% hydrochloric acid solution for 15 minutes and then grinding. It again shows disruption of the cell structure.

To summarize what was determined by the photomicrographs and other microscopic observations, the normal cell structure of both fresh and desiccated coconut consists of elongated cells that are relatively uniform and aligned in compact rows in cell bundles. In fresh coconut, these cells are filled with fat and water, and in desiccated coconut the cells retain fat with only a small amount of moisture. A small amount of free fat (e.g. fat exterior of the cells) may be present in fresh coconut and somewhat more free fat present in desiccated coconut. The cells resist disruption when boiled in water. When the material is passed through a mechanical disintegrator, the cells are chopped into cell portions of shorter length, but the inherent structure of the cells is not altered. Acid treatment according to the present invention drastically alters the cell structure by disrupting the cells, the amount of disruption depending upon the pH of the solution and the time period and temperature of the treatment. In addition the cells are reoriented relative to each other to provide a loose absorbent mass. Disintegration or grinding after the acid treatment causes a reduction in the size of the cell material. The acid treatment also serves to release a substantial part of the fat content, and more fat is released by further mechanical grinding.

In addition to microscopic analysis of the samples referred to above, some additional sugar impregnated samples were prepared as follows. Desiccated coconut was boiled in 0.5% hydrochloric acid solution for a period of 15 minutes. The hydrated and tenderized coconut meat was then removed from the acid solution, and after draining away excess liquid, the material was immersed in a sugar syrup at a temperature of about 215°F. The syrup contained a dye for the purpose of determining the extent of penetration into the tenderized meat. After being immersed in the hot sugar syrup for a period of 40 minutes, the material was removed, and after cooling was subjected to microscopic examination. It was observed that the colored syrup had been absorbed completely into and around the disrupted cells. In contrast, a control sample made by immersing shredded desiccated coconut in boiling water for a period of 15 minutes, followed by immersion in colored sugar syrup at a temperature of 215°F. for a period of 40 minutes, revealed on microscopic inspection that the colored syrup was only irregularly adsorbed on the surface of the cell bundles.

It is evident from the foregoing that the acid treatment of the present process changes the character of the cell structure and cell bundles in a manner which cannot be obtained by boiling in water or by mechanical disintegration. The cells are individually disrupted with disruption of the cell bundles and reorientation of disrupted cells in a random fashion to produce a loose absorbent mass. The smaller particle size material has unique properties, including the ability to form a creamed material as described above, the ability to act as a dispersing agent (e.g. in connection with water-oil dispersions), and the ability to impart viscosity and stability to various materials to which it is added.

Figure 4:
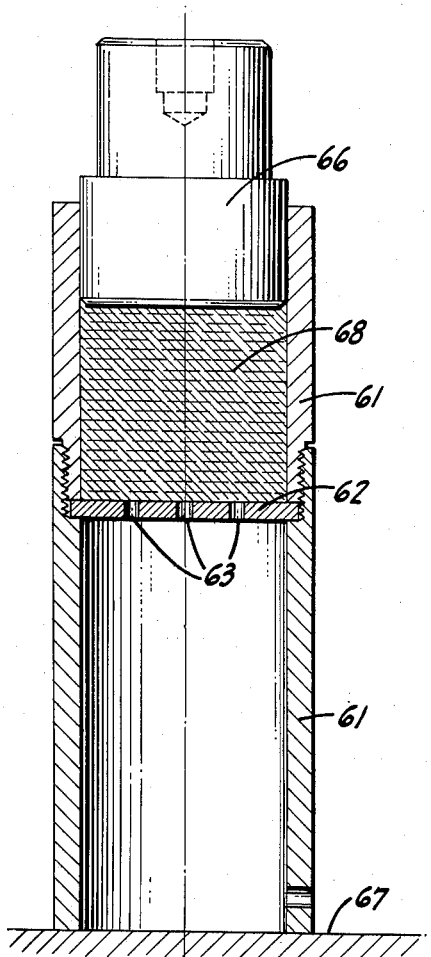
FIG. 4 is a side elevation in section showing a device for testing the extrudability of the products produced.

A number of samples of treated coconut material were tested to determine their extrudability. The test cell of the equipment used for this purpose is shown in part in FIG. 4. It consists of a stainless steel tube 61 having an internal diameter of 1 inch and made in two sections coupled together and supporting the perforated disk 62. The disk was provided with nine holes spaced apart one-fourth inch between centers and each having a diameter of 0.0465 inch. Above the disk 62 the tube was fitted with a piston or plunger 66 having an external diameter slightly less than the internal diameter of the tube. The plug was made whereby it could be coupled to the force-applying cross arm of a laboratory recording machine (Instron), the arrangement being such that with the tube 61 resting upon the supporting surface 67, plug 66 could be moved downardly at a predetermined speed against the sample 68. Assuming that the test is started with the upper portion of the tube 61 above the disk 62 being completely packed with the sample. As the plunger 66 moves downwardly the sample is first gradually compressed and eventually the force is sufficient to cause the sample to be extruded through the holes 63. Eventually the plug reaches a position near the disk 62 and substantially all of the sample has been extruded. At this point the downward travel of the plunger is arrested. By recording the forces at various points along the travel of the plunger 66, it is possible to make a comparison between the extrudability of various samples.

Samples were prepared for extrusion testing as follows:

A control sample was prepared by boiling short shred desiccated coconut for 15 minutes, after which the material was drained on a screen and pressed. Draining and pressing of this sample and other samples was carried out by depositing the sample on a 35 mesh screen (U.S. Standard). After holding for a short time to permit free liquid to drain off, the sample was lightly and evenly pressed against the screen to eliminate further free liquid.

Additional samples were prepared for extrusion testing by immersing desiccated short shred coconut meat in a 0.65% hydrochloric acid solution (pH 0.86) at boiling temperature. One sample was removed at the end of 4 minutes and another sample removed after 18 minutes. In each instance the removed sample was adjusted to pH 6.4 by immersion in a solution of sodium bicarbonate. Also each of the samples was drained and pressed.

The equipment was set to produce a speed of movement of the plunger of 0.5 inch per minute and to provide a chart speed of 5 inch per minute. For the testing of each sample, it was introduced into the device shown in FIG. 4 in sufficient quantity to fill the sample chamber.

Figure 15:
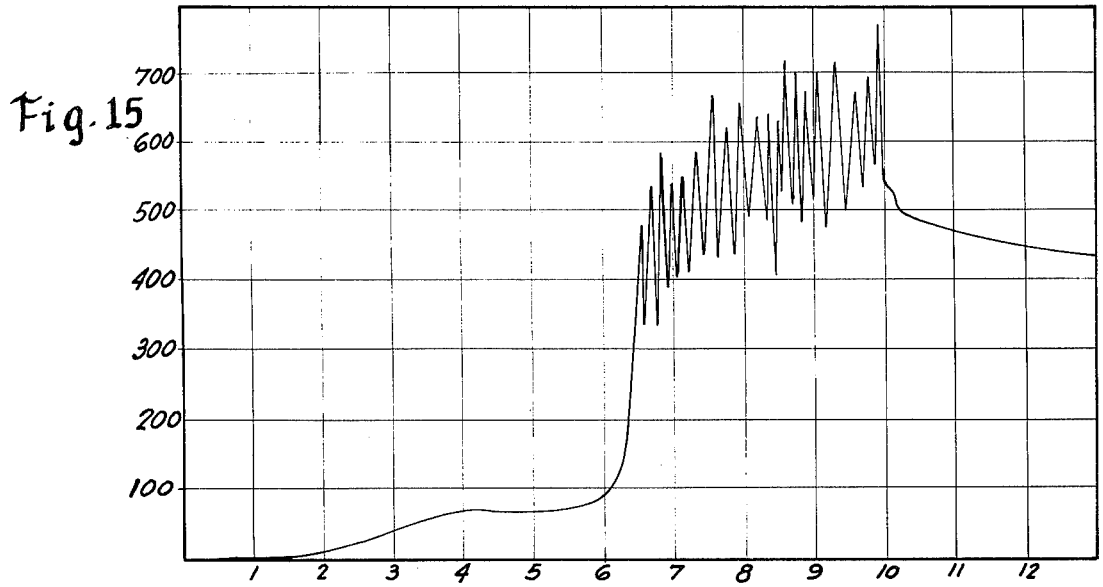
FIGS. 15 – 17 are graphs showing the results of extrusion tests.

The extrusion graph made using the control sample is shown in FIG. 15. The forces applied to the sample are on the vertical axis. Extrusion occurred between 320 to 800 lbs. minimum and maximum limits. Considerable oscillation of the recorder pen occurred during extrusion because the crispness of the coconut meat caused wide variation in extrusion force. In general, this test showed that high average forces were required for extrusion, that the extrusion forces varied widely, and that there was a great difference between minimum and maximum forces.

Figure 16:
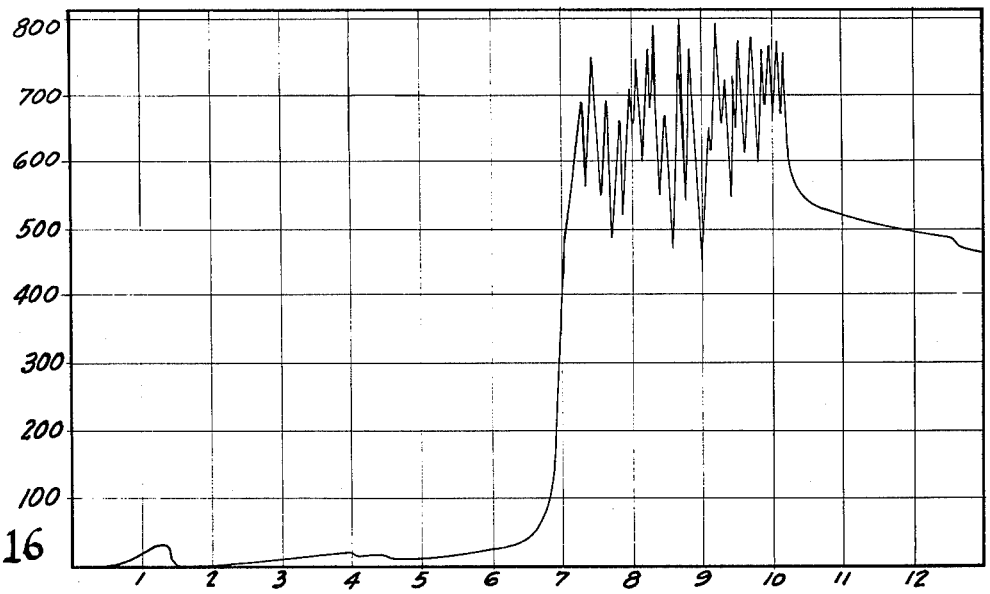

The graph shown in FIG. 16 was made using the sample removed from the hydrochloric acid solution after 4 minutes. Here again the minimum force was relatively high (about 400 lbs.) and again the forces varied widely during extrusion. The maximum force was about 820 lbs. This demonstrates that for the short time period of treatment there was no substantial change in the character of the material.

Figure 17:
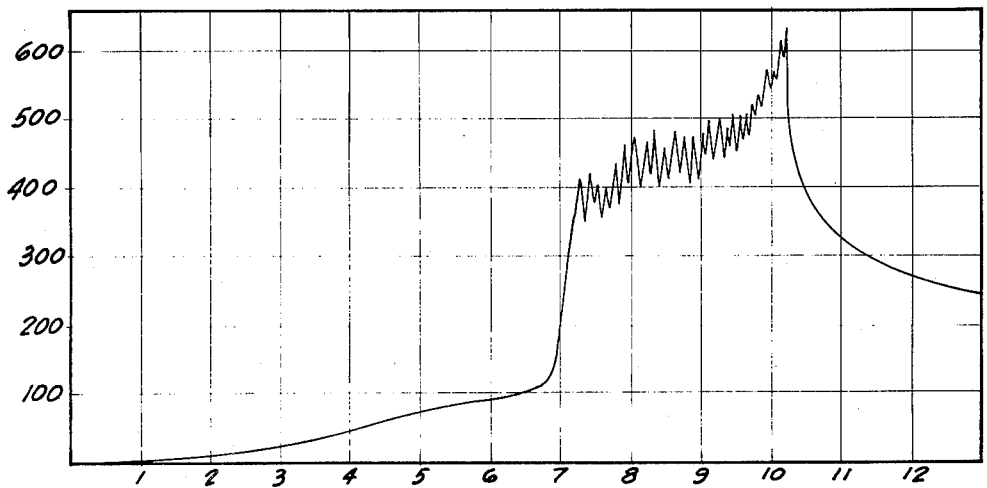

FIG. 17 is a graph made by testing a sample which has been treated in the boiling hydrochloric acid solution for a period of 18 minutes. Here the minimum force for extrusion is about 320 lbs. and the maximum force about 640 lbs. This variation in force between minimum and maximum limits is considerably less than that shown in FIGS. 15 and 16 and in general, the average extrusion force and the force excursions are substantially less. This graph demonstrates the tenderizing effect on the coconut produced by extending the time of treatment with other factors remaining constant.

In all of the graphs of FIGS. 15 to 17, the relatively high peak force near the end of the graph is due to the resistance to lateral movement of the material as the plunger reaches a position in close proximity with the disk. That portion of each graph beyond the point of peak force represents a shutdown of drive to the plunger.

In making the extrusion tests described above, it was observed that the samples which had been treated with the hydrochloric acid solution gives continuous string-like extrusions. In contrast, the samples which had not been treated with the acid solution gave extrusions which were discontinuous and tended to break apart.

To summarize the results of extrusion tests, the present invention promotes extrudability and a consistency enabling continuous extrusion strings. It greatly reduces or eliminates the crisp characteristic of fresh or rehydrated desiccated coconut. Extrudability is promoted by the present process and increases with more extensive disruption of cells by the acid treatment. For most purposes, it is considered that the extrudability of the sample corresponding to FIG. 17 is a minimum, and that in practice it is desirable to provide somewhat greater extrudability by control of the various processing factors, as for example, by extending the time period of acid treatment or lowering the pH of the solution.

Examples of my invention are as follows:

EXAMPLE 1

The source material was 100 lbs. of commercial desiccated coconut in shredded form having a moisture content of about 2.5 percent. It contained all of the original oil content of the coconut meat. Three hundred lbs. of water was acidified to 0.5% hydrochloric acid (added as a 37% HCl solution), thus effecting a hydrogen ion concentration of pH 1.3. This acid solution was heated to boiling point (212°F.) in a steam jacketed agitated kettle and the shredded coconut added. Further heating with agitation over a period of about 2 minutes was required to bring the temperature back to boiling point. The batch was then held with continued agitation for about 18 minutes at boiling point, after which heating was discontinued and a cold solution of sodium bicarbonate added to effect neutralization, the solution comprising about 3 lbs. of sodium bicarbonate dissolved in 32 lbs. of cold water. After adding the alkali solution agitation of the batch was continued for a period of about 15 minutes. At that time the pH of the batch solution was 5.8. It was observed that addition of the alkali solution also served to terminate the tenderizing action of the acid solution, presumably because of some immediate cooling and neutralization of the acid.

Examination of the shredded coconut produced in the above Example 1 revealed that its liquid content was at about pH 5.0, and the shreds were white and comparable in color to the original source material. The treated shreds had sufficient firmness to enable removal from the liquid of the batch as by draining on a screen. This was also true of some treated shreds that were removed from the batch immediately before addition of the alkali solution. Shreds removed from the acid solution immediately before neutralization contained a small amount of residual acid which could be reduced by washing. Shreds removed from the neutralized batch were slightly salty due to the presence of sodium chloride. This likewise could be reduced by washing with fresh water. In both instances the treated shreds had properties which distinguished them from the source material. Particularly they no longer had the characteristic toughness of the source material, but on the contrary were relatively tender and absorptive. It was confirmed that such shreds could be extruded by use of the laboratory device illustrated in FIG. 4 and that the forces required were not excessive and were comparable to those indicated in FIG. 17.

Moist pieces removed from the acid solution after the tenderizing treatment of Example 1, while at a temperature of about 200°F, were ground in a hammer mill to produce a smooth slurry. A similar slurry was produced by grinding the moist pieces after neutralizing the acid. It was confirmed that the liquid removed from the pieces after the acid treatment contained a substantial amount of oil and protein and that this material could be centrifuged for separation of oil and water fractions. Also it was confirmed that the liquid fraction had a solids content which could be recovered as by concentrating or drying, and that such "solubles" could be returned to the process. The cells of the tenderized pieces were disrupted with formation of a loose open structure, in contrast with the closely associated rod-like cells of the source material.

EXAMPLE 2

The source material was the same as in Example 1, namely 100 lbs. of desiccated shredded coconut. The coconut was immersed in 300 lbs. of water at 212°F. Sufficient heat was applied to bring the temperature back to 212°F. after addition of the coconut, and then the batch was held at this temperature for about 15 minutes. The batch was then centrifuged in a centrifuge of the basket type whereby 136 lbs. of moist hydrated coconut was obtained. The liquid removed was also centrifuged to produce fat and water fractions, the fat weighing 21 lbs. The moist coconut, which had a moisture content of about 40% was then added to a boiling acid solution prepared by introducing 3.5 lbs. of a 37% solution of hydrochloric acid into 250 lbs. of water. After boiling for 15 minutes, the acid was neutralized as in Example 1 by addition of cold sodium bicarbonate solution. The treated moist coconut particles when removed from the liquid after this treatment had substantially the same properties as described in Example 1. They had a slightly salty taste due to the residual salt content. This could be largely removed by simple washing. This product had good extrudability when tested in the manner previously described. The material had substantially the same extrudability as in Example 1. The fat and protein contents of the tenderized pieces were somewhat lower than the pieces produced by Example 1 which was attributed to removal of a substantial amount of fat and protein before and immediately after the acid treatment. Due to the reduced fat content, the pieces were somewhat more absorptive than the pieces of Example 1.

EXAMPLE 3

The source material and procedure were generally the same as in Example 1 except that some additional hydrochloric acid was introduced to provide an acid content of 1% (pH 0.8). Also the treatment time in the boiling acid solution was increased to 30 minutes. At the end of the 30 minute period sodium bicarbonate solution was added to effect neutralization of the acid, whereby the pH of the liquid content was increased to about pH 5.8. Physical disintegration of the coconut shreds occurred during the acid treatment, and at the end of the 30 minute period it was found that the shred form had essentially disintegrated, leaving finely divided slurry solids. The product obtained was a thickened slurry of coconut solids together with coconut fat and water which was of smooth creamy consistency. The fat content was homogeneously dispersed in the water, which was attributed to the stabilizing action of the finely divided fiber content derived from the source material. Some small amount of identifiable particles were noted but they were observed to be quite soft. They were of mush like consistency and could be easily compressed between the fingers.

EXAMPLE 4

The source material was 100 lbs. of commercial desiccated coconut in shredded form, having a moisture content of about 2.5%. This material was introduced into 350 lbs. of water at boiling temperature, and held at that temperature (212°F) for about 15 minutes. The resulting batch was then divided into two equal batches, and each of these batches was then dewatered in a 24 inch diameter basket-type centrifuge. The screen side walls of the centrifuge had apertures of one-sixteenth inch in diameter, and the basket was rotated at 800 r.p.m. for about 3 minutes. The resulting dewatered material or presscake weighed about 132 lbs. It contained about 50% of the fat contained in the original coconut. The liquor from the centrifuging operations was centrifuged to produce a fat fraction weighing 24 lbs. This was a natural clear oil or fat with a mild coconut flavor and a hardening point of about 85°F. It was found possible to remove the residual coconut flavor of the fat by mixing it with boiling water and then recentrifuging. The remaining 132 lbs. of presscake was broken up and introduced into 250 lbs. of water which was acidified by adding 3.38 lbs. of 37% solution hydrochloric acid. This provided a solution containing 0.5% hydrochloric acid and a hydrogen ion concentration of pH 1.3. The batch was then introduced into a scraper agitated steam jacketed kettle where it was heated to boiling point (212°F) and held at that temperature for about 15 minutes. The acid treatment was then arrested by adding 100 lbs. of cold water (70°F). Then the total batch was again divided into equal portions, and each portion centrifuged to remove free liquor. The combined weight of the two portions after centrifuging was 93 lbs. The solids content was about 65% with a pH of 2.6 when 1 gram was slurried with 10 grams of distilled water. This product had a mild acid flavor. It was determined that this acid flavor could be substantially reduced by resaturating with fresh wash water and recentrifuging. The coconut particles were individually intact, but the cells had been disrupted and the structure of the particles modified whereby they were relatively tender and absorbent. The structure was analogous to nuts like pecans in contrast with the pronounced coarse and grainy texture of the starting coconut. It was confirmed that the material was readily extrudable without the characteristics represented by FIG. 15. About one-half of the fat and protein of the source material was removed.

EXAMPLE 5

Tests were made to determine whether or not it was desirable to use food acceptable organic acids such as lactic, tartaric, citric, malic and fumaric in place of hydrochloric acid. It was found that although a mild tenderizing effect could be obtained by the use of such food acceptable organic acids, the results obtained were not comparable to the use of hydrochloric acid. Particularly, to obtain only a mild tenderizing effect, it was necessary to use stronger concentration of the organic acid and to continue boiling over periods of the order of 40 minutes or more. Thus, using lactic acid, a 5% solution gave a mildly tenderizing effect after boiling for about 40 minutes. This was in contrast with the use of hydrochloric acid as in Example 1 which gave an equivalent amount of tenderizing after only 5 minutes of boiling. A greater tenderizing effect was obtained when sufficient lactic acid was introduced to produce a pH of 2.0 and boiling carried out in an autoclave at 15 p.s.i. for a period of 40 minutes. The same results were obtained by the use of furmaric acid. Grapefruit juice (pH 3.3) was also tried in place of the organic acids specified above, but gave negligible tenderizing effects after boiling for 1 hour in an autoclave at 15 p.s.i. As a result of the foregoing tests, it was concluded that although organic acids could be used for some tenderizing effect, particularly at the higher temperatures, or under pressures above atmospheric or over extended treatment time, markedly superior results were produced by the use of food acceptable inorganic acid (e.g., hydrochloric), thus making such acid preferable for commercial use. In addition to the foregoing, hydrochloric acid when neutralized with a common alkali like sodium bicarbonate, leaves common salt (NaCl), which is not toxic and is an acceptable ingredient in most foods.

With respect to inorganic acids other than hydrochloric, it has been found that a 1% solution of sulfuric acid (pH 1.45) gives good tenderizing over a period of 20 minutes at 212°F. A 2% solution of phosphoric acid (pH 1.55) gives good tenderizing over a period of 130 minutes at 212°F.

On the basis of Example 5 and other tests, it has been concluded that the pH of the acid treatment solution, the temperature of the solution, and time period of treatment are factors which affect the results obtained and which can be controlled to obtain the particular type of product desired. In general, a lower pH value produces a greater effect for a given temperature and time. As previously stated, it is considered preferable to employ acid solutions having pH values below 3.0 such as pH 2.0 to 0.57. This makes possible temperature and time factors that are suitable for commercial use.

EXAMPLE 6

The procedure was the same as in Example 4. However, the presscake resulting from centrifuging the material from the acid treatment was resaturated with neutralizing solution at about 140°F. The solution was prepared by dissolving one-half lb. of sodium bicarbonate in 200 lbs. of water. Resaturation with this solution provided a pH of about 6.4 to 6.6. After holding period of about 5 minutes, the batch was again centrifuged in two equal portions in the same manner as described in Example 4. After centrifuging the presscake was separated from the side walls of the basket and the masses broken up and resaturated with fresh water (50 lbs.) after which the material was again centrifuged. This treatment effectively removed substantially all traces of acid and sodium chloride formed as a reaction by-product in the neutralizing step. The final weight of the moist material was 90 lbs. and comprised about 40% moisture and 60% solids. This was in contrast to the 100 lbs. of original starting coconut. The pH of the removed liquid was about 6.8. This liquid was blended with the acidified liquor removed by centrifuging immediately after the acid treatment. Some additional sodium bicarbonate (0.5%) was added. This provided a slightly alkaline solution and served to partially break down the water-fat emulsion. This liquor was then centrifuged with recovery of 9 lbs. of fat. The fat was recovered in a clear state with no undesirable odor or flavor. The total amount of fat recovered was 24 lbs. before the acid treatment, plus 9 lbs. recovered from the slightly alkaline liquor, making a total fat recovery of 33 lbs. Thus about one-half of the oil present in the starting coconut was recovered, with the remaining oil being retained in the moist presscake. The combined yield from the 100 lbs. of desiccated coconut on a solids basis was 93 lbs. of moist presscake, which represented 54 lbs. of moist useful solids plus the recovered fat weighing 33 lbs., making a total of about 87 lbs.

EXAMPLE 7

The material used was moist tenderized shredded coconut particles produced by Example 4. Separate samples of this material were subjected to sun drying, kiln drying, drum drying, vacuum shelf drying and freeze drying. It was found that the material could be readily dried to a moisture content below 2%. In each instance, the product produced was of good color without evidence of deterioration during drying and without impairment of flavor or odor. The samples subjected to freeze drying were whitest in color, and after storage for one year at ambient room temperature protected from moisture gain, showed no noticeable deterioration. The dried materials were highly absorptive to water and fats, and readily rehydrated when contacted with water. Particularly, the material was absorptive with respect to various liquid or semiliquid mediums such as syrups, hydrolyzed cereal, water-fat emulsions, and other liquid or semiliquid materials having edible components in dissolved or colloidal form. In general the dry products were capable of absorbing from two to three times their weight of liquid materials like water and water-fat emulsions, liquid milk, various syrups (e.g., sugar, corn syrup or hydrolized starch and cereal syrups), coloring and flavoring.

EXAMPLE 8

Moist and tenderized coconut shreds produced as in Example 4 were contacted with some of the melted coconut fat recovered in the process. The fat was rapidly absorbed by the coconut meat. It was found possible to absorb 1 lb. of fat in 10 lbs. of the moist shredded and tenderized coconut. For the overall process, this represents about one-half of the amount of fat recovered in the preliminary treatment of the coconut meat preceding the tenderizing acid treatment.

EXAMPLE 9

Example 8 was repeated with the use of coconut fat emulsion instead of regular fat. This emulsion was taken from the waste liquors resulting from the dewatered and washing procedures following the tenderizing operations of Example 4. After combining these liquors, the fat emulsion was permitted to separate and float upon the surface of the liquor. It was found that the moist tenderized coconut absorbed this emulsion. Samples of the coconut after fat emulsion absorption were dried in a vacuum dryer to produce a good quality dry coconut having a substantial fat content.

EXAMPLE 10

Ten pounds of moist tenderized slurry was produced as in Example 3 except that the source material was macaroon desiccated coconut. This was passed while, at 190°F., through a grinding mill to effect further comminution of the solids to at least about one-half the original particle size. This slurry was then reduced to a dry discrete powdered product in a dryer of the spray type. It was found that this dry discrete material had good keeping properties and that it had high absorptivity as previously described. It could be combined with various other materials serving as a thickener and stabilizer, as described in the foregoing specification.

It was noted that the moist tenderized coconut could be readily ground to a fine state of subdivision, whereas it is difficult to attain comparable fineness by fine grinding untreated fresh or desiccated coconut. Also, fresh or desiccated coconut when finely ground does not have the same absorptive, thickening and stabilizing properties possessed by my finely divided product.

EXAMPLE 11

Another discrete dry product was made by comminuting 10 pounds of the moist shreds produced in Example 4 (after washing) in the hammer mill, together with 20 pounds of added water. This produced a slurry which was spray dried in the same manner as described in Example 10. The dry material obtained was similar in properties to the dry product of Example 10, except that it was relatively free of acid and salt and had a lower fat and protein content.

EXAMPLE 12

Moist tenderized coconut meat produced in Example 4 was comminuted in a hammer mill and 10 pounds of this material was then intermixed with 3 pounds of refined water-fat emulsion (e.g., 50% water) obtained in the same manner as in Example 6. This batch was then introduced into a scraper agitated kettle and heated to boiling temperature. It was held at that temperature for 10 minutes with the result that the fat content of the slurry was abosrbed by the particles. A minor part of the fat remained with the liquid fraction. This slurry was then spray dried to produce a discrete dry product having the fat incorporated within the coconut particles. The final product had a moisture content of less than 2% and a fat content of about 70%.

EXAMPLE 13

A slurry of tenderized coconut, produced as in Example 3 followed by grinding, was blended with a mixture of materials including a coconut water-fat emulsion, 10% of which had been blended with 5% granulated sugar, 5% hydrolized cereal solids and 5% nonfat dry milk solids. Blending was at an elevated temperature of about 200°F. The resulting hot slurry was dried in a dryer of the vacuum type with heat being applied at 160°F. over a drying period of about 4 hours. This produced a friable cake which readily broke up in a hammer mill to produce a sweet dry discrete product. This product was suitable as a thickener and stabilizer in various bakery products, and was also suitable for use in ice cream mixes, frozen desserts, semi-liquid desserts and the like.

EXAMPLE 14

The source material in this instance was commercial sun or kiln dried clean copra meal containing skins as well as coconut meat. One hundred pounds of expeller meal resulting from the grinding of copra, followed by pressing for removal of a substantial part of the oil content, was treated in the manner described in U.S. Pat. No. 2,422,893 to effect separation of skins from the meat. The coconut meat was then introduced into 600 pounds of boiling water to effect hydration as in Example 4. This material was dewatered in a basket type centrifuge and the resulting moist presscake introduced into 600 pounds of water containing 1% hydrochloric acid. This batch was then boiled at atmospheric pressure for 7 minutes. This served to tenderize the coconut meat and to weaken the bond between the meat and residual skin material without altering the physical identity of the particles. The batch mass of material was then treated to hydraulic separation carried out in the manner described in U.S. Pat. No. 2,422,893, to remove remaining skin material. The remaining batch was centrifuged in a basket type centrifuge apparatus to dewater the same, and the remaining moist presscake was resaturated with water containing sodium bicarbonate as described in Example 6. This served to neutralize remaining acid. Further centrifuging served to remove the free liquor together with most of the by-product sodium chloride. The resulting presscake was in the form of a moist granular material with the individual particles tenderized uniformly throughout.

The foregoing Example 14 makes use of mechanical separation of skins from coconut meat but in a manner which gives results superior to the results obtained with the method of U.S. Pat. No. 2,422,893. In addition, the separation of skins is carried out in connection with a tenderizing operation which produces a different final product.

While the foregoing Example 14 demonstrates that copra meal can be used in conjunction with separation of skins, the final products obtained are not of the same quality as those produced by the use of fresh coconut or the desiccated forms of coconut, having reference particularly to such quality factors as color and flavor.

In addition, to using copra as in the preceding Example 14, it should be understood that copra can also be used as a source material in a procedure as in Example 1, provided the coconut is pretreated in the manner described in this Example 14 for removal of skins. Also some fat can be removed from the copra by the use of a suitable expeller before treatment.

EXAMPLE 15

The source material was fresh coconut meat. It was first peeled and then diced to particles about ⅜ inch square and about ½ inch long. The procedure was generally the same as in Example 1 with 100 lbs. of the fresh coconut dices replacing the desiccated coconut. Treatment in the boiling acid solution was continued over a period of 40 minutes. The batch was then neutralized by adding a solution of sodium bicarbonate and holding the batch with agitation for 1 hour. After neutralizing the resulting particles were observed to be white in color, the same as the original source material. The liquid removed from the moist pieces after neutralizing (at about pH 6.0) was centrifuged and 7 lbs. of fat recovered. When tested for extrudability in the manner previously described, the pieces were found to be readily extrudable at forces well below 100 lbs. In general, the treated particles were tender in structure, having a texture similar to a pecan or walnut meat, in contrast to the relatively firm character of the starting dices. The pieces had a coconut flavor that was relatively mild compared to the fresh meat.

In connection with the above Example 15 it was verified that a reduction of time in the acid solution to 15 minutes served to tenderize the outer regions of the pieces, leaving the central core relatively firm. This core retained more coconut flavor than the surface modified areas.

EXAMPLE 16

10 lbs. of coconut dices produced as in Example 15 was introduced into a scraper agitated steam heated kettle containing 20 lbs. of boiling corn syrup (43 D.E.) at 80 Brix. With continued application of heat boiling recommenced in about 5 minutes and was continued for an additional 5 minutes. The dices were then removed from the hot syrup and rinsed with boiling water to remove surface syrup. They were then dried in a kiln tray dryer commencing with an air temperature of about 190°F. and finished at the end of 48 hours at an air temperature of about 160°F. The final moisture content was below 2%. The resulting product was nut-like in consistency with a sugar-impregnated sub-surface area of denser structure and with good crunchy eating characteristics.

EXAMPLE 17

Tenderized moist coconut dices produced as in Example 15 were shredded to produce short shreds about ⅛ inch thick. These shreds were then dried in a kiln dryer. It was found that the dried shreds possessed high absorptivity and were adaptable for incorporation in many products. Particularly with respect to absorptivity of flavors, it was found that the 10 pounds of the dried material quickly absorbed about one-half pound of flavored oil, 2 oz. glycerine, or 4 oz. sorbitol.

EXAMPLE 18

The source material again was fresh, tenderized coconut dices produced as in Example 15. This material was comminuted in a hammer mill together with an equal quantity of added boiling water to produce a slurry. This slurry was then spray dried to form a dry discrete powder. The resulting product had the characteristics of the product described in Example 11.

EXAMPLE 19

Washed coconut fat recovered in accordance with Example 4 was blended with an equal amount of commercial vanilla flavored coconut fat. While the dry particles produced in Example 7 were warm (e.g., 90° – 100°F) they were coated with the fat blend to provide a congealed surface coating which added to the flavor of the coconut pieces.

EXAMPLE 20

The source material was commercial desiccated macaroon coconut. The procedure was generally as described in Example 3, the acid treatment being carried out in such a manner as to produce a slurry containing all of the constituents of the original source material. More specifically, the source material was introduced directly into the acid solution and boiling continued for a period of 20 minutes. At the end of this treatment the batch was cooled, and neutralized as in Example 3. At that time it contained about 200 pounds of water, the remainder being solid constituents derived from the source material. 100 pounds of the source material produced 296 pounds of slurry. This slurry was then placed in a scraper agitated steam jacketed kettle together with 80 pounds of granulated sugar, 90 pounds of corn syrup at 80 Brix, and 90 pounds of invert syrup at 80 Brix. The combined batch was brought to boiling temperature and evaporation continued with agitation for a period of 40 minutes, whereby the concentration increased from an initial 47 Brix to about 82 Brix to form a paste. It was noted that the sugar syrup had effectively been absorbed and incorporated about the disrupted cells of the coconut solids present. In addition to absorption of syrup in the discrete particles of coconut it was noted that much of the fat and soluble material derived from the source coconut was reabsorbed into the coconut particles together with the syrup. This served to stabilize the paste and to provide a consistency which was not excessively oily, and particularly was not oily to the same extent as if the fat had been added to the final paste. It was found that the final paste-like product could be packed in film lined cases in the same manner as commercial shortening, and upon cooling to ambient room temperature the product developed adequate solidity or structural strength to retain its physical form during shipment.

It was confirmed that the paste-like product produced according to this Example 20 was useful as a base for bakery and confectionery products. It was found that various natural or artificial food colorings could be added, and that such coloring was readily absorbed without being masked by the presence of the solids. It was also confirmed that a wide variety of edible food materials could be added to the paste, including bits of confections like caramel and chocolate, pieces of dried fruits like dates or apricots, vegetable solids like tomato paste, or dairy food products like milk solids or cheese. In connection with such blended products, it was found that the coconut solids served to lend stability to such blends when used in baking, and that baked products containing such materials possessed long shelf life. Also when used as a filling in dough products, moisture migration was minimized by the stabilizing effect of the coconut solids.

In carrying out the above Example 20, it was confirmed that some liquids could be removed from the slurry following the acid treatment by known procedures such as centrifuging, filtration, or settlement and decantation. This served to produce a slurry having a higher solids content, which may facilitate further processing and blending. Also removal of some liquor in this manner serves to remove a part of the fat and protein present, which may be desirable when one desires products with a content lower than the original source material.

EXAMPLE 21

The procedure was the same as in Example 1, except that the amount of hydrochloric acid used was 1%. The acid treatment was carried out at 212°F. over a period of 10 minutes. At the end of that time, 30 pounds of cold water (70°F.) containing 6 pounds of sodium carbonate was added to the batch. This served to neutralize the residual acid and to reduce the temperature to about 180°F., thus quickly terminating the acid treatment. The resulting slurry contained about 25% solids, and the solids were essentially in discrete form. This slurry was then centrifuged to remove about 60% of its water content and about 40% of the oil content. The resulting thickened presscake contained 60% solids. To it was added 25 pounds of granulated sugar, 50 pounds of corn syrup and 50 pounds of invert syrup, to produce a syrup concentration of about 50 Brix. This was then heated to boiling point, and simmering continued over a period of about 30 minutes to effect impregnation and incorporation of the discrete solids with the syrup.

EXAMPLE 22

The source material was moist tenderized coconut shreds produced as in Example 4. The objective was to produce a thickened fruit containing spread (e.g., "Spread" as defined in F.D.A. Specifications). Orange marmalade, a pure jam containing fruit solids, was concentrated by evaporation with added sugar to produce a concentration of 68 Brix. To 30 pounds of this hot jam there was added with stirring 10 pounds of the moist coconut presscake produced as described in Example 4 with some immediate thickening of the jam. After standing overnight it was evident that the coconut had significantly thickened the product. The moisture added by way of the coconut reduced the consistency of the product to a spread of 58 Brix, but the spread was thicker or more viscous than the jam itself at the higher concnetration. When used in baked products as a filling, it spread less during baking than the same jam without the coconut. The coconut modified the gel properties so that with or without a little added milk solids, for example, and eaten as a refrigerated dessert, it had pleasant spoonable eating properties.

EXAMPLE 23

The procedure was as described in Example 22 to produce a jam-like filling. A cooky dough was prepared according to the following formula:

| Flour | 25 lbs. |
|---|---|
| Granulated Sugar | 9 lbs. |
| Shortening | 11 lbs. |
| Corn Syrup | 6 lbs. |
| Eggs | 3 lbs. |
| Vanilla Flavoring | 1 oz. |
| Baking Powder | 1.5 oz. |
| Baking Soda | 1.5 oz. |
| Nonfat Milk Solids | 1 lb. |
| Water | Sufficient to make suitable dough consistency |

20 pounds of the confection jam-like filling as produced in Example 22 was placed in a mixer and flavored with a small amount of orange oil. Also small amounts of Red No. 3 dye and orange coloring were added to produce a desired orange color. 5 pounds of the cooky dough (one-fourth of the weight of the jam filling) was mixed into the same. A quantity of the cooky dough was formed into biscuit-like disks about 5 inches in diameter and about ⅜ inch thick. Each disk weighed about 50 grams. A strip of the jam-dough mixture was then applied on top of each of the cooky dough disks, each strip being about 1½ inches wide. These disks with the overlying jam-dough strips were then baked and during baking it was observed that there was some leavening or expansion of the dough and the filling. After baking, the cookies were permitted to cool, at which time the jam-dough filling collapsed on the surface of the baked dough. There was no noticeable crumb structure in the overlying filling, which was attributed to the fact that the flour content of the jam-dough was below about 10%. However, the presence of a small amount of dough or dough ingredients in the filling made the filling less sticky without, however, giving the appearance of a farinaceous dough. The jam-dough mixture was in effect a type of macaroon dough with the coconut lending body and stability and providing a macaroon effect.

EXAMPLE 24

A chicken was boiled in 3 lbs. of water for 30 minutes and the meat separated from the bones. The bones were crushed and marrow removed. The removed meat and marrow together with skin, heart and liver were ground together in a meat grinder and again boiled to a concentration of 30% solids where it began to thicken due in large part to its gelatin content. This stock was mixed with one-half its weight of tenderized coconut presscake as described in Example 4. With brisk agitation the stock was then cooked down to 50% solids, at which point it was a thick paste. The addition of the coconut broke up the gel and converted the paste to a macaroon-type material similar in many respects to nut paste. The final product was usable as a filling for food products, particularly refrigerated distributed dough products, and in baking the mass did not liquify or run. In storage, moisture did not migrate from the filler to the dough in such fashion as to deteriorate the dough. The product could be merchandised in the form of a refrigerated tart with the filler comprising one-third of its weight.

The final filling product of Example 24 had the characteristics expected of a good sausage filling, in that it did not form a jell, was not pasty, and in baking it did not form a crumb. It retained its moisture after refrigerated storage for several weeks, without migrating into the baked dough.

EXAMPLE 25

The starting material was a plastic paste produced as in Example 20. It was concentrated by evaporation to 80 Brix in a scraper agitated kettle and then transferred to a steam jacketed mixer, where it was further concentrated by evaporation to 93 – 95 Brix. To this plastic batch there was added 3 oz. of orange oil and one-half oz. of lemon oil and orange coloring. Also while hot, sufficient granulated sugar (e.g., about 50 lbs.) was added, whereby the moisture content was reduced to about 2 – 5%. The hot mass was then removed from the mixer and sheeted to produce sheets about ⅜inch thick. These sheets became brittle when cooled below 100°F. The brittle sheets were then fed to a pair of breaking rolls where they were fractured to produce particles sized to pass a 6 mesh screen but to remain on a 12 mesh screen. These orange colored and flavored bits were then mixed with a cooky dough in the proportion of 25% of the bits to 75% cooky dough. This mix was then deposited as individual cookies in a pan and subjected to conventional baking in an oven. Upon inspection of the cookies it was found that the orange colored particles had retained their flavor and color, they did not burn when in contact with the pan and they did not disintegrate or break down either in baking or during storage. Also, the particles did become incorporated with ingredients of the cooky dough, but retained their identity.

EXAMPLE 26

In general, the procedure was as described in Example 25. However, instead of introducing granulated sugar into the plastic paste, I added corn sugar. In addition, corn syrup was used in place of invert syrup in preparing the starting material. After concentration by evaporation, sheeting and breaking into bits, the particles were dusted with corn starch and then placed in a tray that was introduced into a vacuum oven having a shelf temperature of 160°F. After initial heating to soften the particles, a partial vacuum of 29 inches mercury column was applied whereby the particles were expanded three times their normal volume. Also the particles were dehydrated to less than 2% moisture. After cooling and removal from the vacuum oven, the particles retained their expanded volume and had good eating properties. They could be mixed with other foods like confections, ice cream, cake batters and dough. They remained suspended in cake and cooky batters and retained their particle identity after baking.

EXAMPLE 27

The source material used was a dry discrete coconut product made as in Example 11. The formula for the materials used was as follows;

10 pounds sweetened condensed milk
20 pounds corn syrup
10 pounds granulated sugar
10 pounds of the dry discrete coconut material referred to above
1 pound salt One-half of the corn syrup was first blended with the condensed milk and this liquid mixture boiled to produce a concentrate of 95 Brix. This served to produce a caramel flavor and color. The remainder of the corn syrup was then added together with the other ingredients. The resulting mix was heated and concentrated by evaporation to an end concentration of 88 Brix. After cooling to about 180°F. the resulting plastic material was extruded into strips which were divided into pieces of confection size. When cooled the pieces were of good caramel consistency, with the characteristic caramel flavor and appearance. It was observed that the coconut solids present served to stabilize the confection, particularly with respect to texture and changes in moisture content. In general the moisture content of the pieces was somewhat higher than conventional practice in the manufacture of caramel candy, which was also attributed to the thickening properties of the coconut solids present.

EXAMPLE 28

The acid treated coconut employed was that described in Example 7 which had been dried in a hot air tray dryer. A cooky mix was prepared according to the following formula:

2 pounds dry acid treated coconut
4 pounds of whole milk
2 ounces ammonia
5 pounds granulated sugar
3 pounds shortening
12 eggs
11 pounds white cereal flour
2 ounces salt
1½ ounces baking soda
1 ounce vanilla extract The acid treated coconut was first rehydrated by introducing it into an equal weight of water. The ammonia was then dissolved in the milk and the rehydrated coconut added. This mash-like material, after settling for 1 hour, was then added to the other ingredients in a mixer to form a smooth dough. The dough was sheeted, die cut to cooky forms, and baked in the usual way in an oven. It was noted that the baked cookies were of a different texture and had different eating properties than conventional sugar cookies. Also the crumb form appeared to be different. The baked cookies were relatively stable with respect to hygroscopicity, which was attributed to the stabilizing effect of the acid treated coconut solids.

EXAMPLE 29

Acid treated coconut dices were prepared as in Example 15, except that the dices were smaller, measuring about three-sixteenths inch thick. After acid treatment and neutralization of acid, the moist dices were introduced into a sugar syrup (at 50 Brix) as in Example 20 and simmered with gradual evaporation of water and increase in sugar concentration until the batch was at about 80 Brix. The final product was a paste comprising a sugar-containing matrix stabilized by finely divided coconut particles dispersed in the matrix and produced by attrition during impregnation, and also comprising pieces of visible size that were impregnated with the sugar containing matrix. The ratio of untreated fresh coconut solids to matrix solids was about 1 to 1½.

EXAMPLE 30

In this example a jam was produced which was suitable for use with refrigerated dough products as described in U.S. Pat. No. Re. 18,426 granted Apr. 19, 1932. The procedure was as in Example 20, except that the ratio of source coconut to sugar syrup solids was 1 to 2, and evaporation of the slurry was discontinued at a batch moisture content of about 25 – 30%, or in other words, the moisture content of unbaked dough. This jam was then used as a filling in unbaked dough as used in U.S. Pat. No. Re. 18,426. The jam remained intact, and substantially no moisture migration occurred between the jam and the dough.

With respect to practical parameters for the various processing factors, when pretreatment 10 is used as in FIG. 1, the water can be at a temperature of from 85° to 212°F. or as high as 220°F. if under pressure greater than atmospheric. Boiling temperature of 212°F. is preferred because it does not involve pressure equipment and is easily reached and maintained. The time period of such treatment may vary from 5 to 60 minutes, about 10 to 20 minutes at 212°F. being preferred. The acid solution may range in pH from 2.0 to 0.57 (pH 1.0 to 1.5 preferred) which for hydrochloric acid corresponds to about 0.13 to 2% solutions. The temperature may range from 150° to 212°F., or up to 235°F. if under pressure (212°F. preferred) and the time of treatment (assuming that the source material is a commercial form of desiccated coconut) may vary from 5 to 60 minutes, depending upon other control factors and the extent of cell disruption desired. At 212°F. and pH 1.3, a period of from 15 to 20 minutes produces tenderizing effects without substantial disintegration, and extension of the treatment for total times of from 20 to 60 minutes serves to effect substantial physical disintegration.

Any acid substituted for hydrochloric (e.g., sulfuric, or phosphoric) should be used in an amount to obtain a solution pH within the range specified above. Also any neutralizing agents other than sodium bicarbonate (e.g. sodium carbonate, potassium carbonate or bicarbonate, sodium or potassium hydroxides, or lime) should be used in proper proportions for neutralization and should be selected to avoid any objectionable residual salt.

As previously indicated, fresh coconut is tenderized or cell disrupted more readily than desiccated coconut, and therefore under given control conditions less time or higher pH values can be used. Also the same applies to the particle size of the material entering the acid treatment step. Thus the larger pieces require more extended treatment time or lower pH values for the same degree of tenderizing or disintegration.

In the foregoing examples the coconut after acid treatment is mixed with a sugar syrup and the mix maintained at boiling temperature until the desired concentration is obtained. While this can be carried out with conventional kettles provided with scraper agitators, the temperatures and times involved may cause some discoloration of the meat. It has been discovered that by use of equipment known as vertical planetary mixers (e.g. AMF Glen vertical mixers made by American Machine & Foundry Co., Richmond, Virginia, U.S.A. with a whip-type beater), evaporation can be carried out rapidly with the batch at a temperature level below its boiling point (e.g. about 10° below the boiling temperature of the syrup). In using such equipment the batch is brought to the required temperature by steam supplied to the heating jacket. The beater is then put into operation at a high speed of rotation (e.g. 370 r.p.m.) The beater rotates on a vertical axis offset from the vertical axis of the kettle whereby the wire members of the beater come into close proximity with the heated kettle walls. Rotation of the beater about its axis is accompanied by giratory movements about the central axis of the kettle. For reasons not clearly understood, the high speed movement of the beater members through ths sugar syrup causes evaporation to take place at a relatively rapid rate and with the batch temperature below its boiling point, thus facilitating completion of the evaporating cycle without undue heating and attendant discoloration. The foregoing method is not claimed herein but will be disclosed and claimed in a separate application naming the present applicant as a joint inventor.

All percentages specified herein are in weight unless otherwise indicated.

I claim:

1. In a process for the treatment of particulate coconut meat that is characterized by aligned rod-like cells arranged in cell bundles, immersing the particulate coconut meat in a water solution of a physiologically acceptable acid at an elevated temperature and at a pH and for a period of time sufficient to effect disruption of cells and loosening of the cells with respect to each other.

2. A process as in claim 1 in which the acid water solution is at an elevated temperature of the order of 180° – 250°F.

3. A process as in claim 2 in which the acid treatment is terminated before any substantial visually apparent physical disintegration of the particulate coconut meat has occurred.

4. A process as in claim 2 in which the acid treatment is continued for a period of time sufficient to effect disintegration of the coconut meat to the form of slurry solids.

5. A process as in claim 2 in which the acid treated coconut is subjected to mechanical disintegration to form a slurry.

6. A process as in claim 2 in which the acid water solution contains an inorganic acid and has a pH value of 2.0 to 0.57.

7. A process as in claim 2 in which the coconut meat is pretreated before immersion in the acid water solution, the pretreatment including immersion of the coconut in water at a temperature above about 85°F. and followed by removal of some free liquor from the batch, the liquor containing coconut fat, dissolved protein and water.

8. A process as in claim 7 in which the free liquor removed from the pretreated coconut meat is subjected to treatment for the separation of fat therefrom.

9. A process as in claim 2 in which the tenderized coconut batch is subjected to dewatering following immersion in the acid solution, with some coconut fat being removed with the water.

10. A process as in claim 2 in which after treatment in the acid solution, acid associated with the material is neutralized.

11. A process as in claim 2 in which the acid treated coconut is subjected to drying to form a dry product.

12. In a process for the treatment of particulate coconut meat that is characterized by aligned rod-like cells arranged in cell bundles, the steps of subjecting the particulate coconut meat in moist condition with an acid-water solution of a physiologically acceptable acid at a temperature of the order of 180° – 250°F. and at pH 2 to 0.57 for a period of time of at least 5 minutes to cause disruption of cells and destruction of cell bundles and reorientation of disrupted cells to form a relatively absorbent material.

13. A process as in claim 12 in which the source of coconut meat is desiccated coconut.

14. A process as in claim 13 in which the coconut meat is hydrated by immersion in water with removal of some fat and protein before acid treatment.

15. A process as in claim 12 in which the treated coconut meat is subjected to drying to produce a dry cell disrupted coconut meat.

16. A process as in claim 12 in which the drying operation is carried out by comminuting the treated coconut meat in the presence of sufficient water to form a slurry, and then drying the slurry to form a discrete dry product.

17. A process as in claim 12 in which the action of the acid solution is continued to cause physical disintegration of the particles to form a slurry.

18. A process as in claim 12 in which the action of the acid solution is terminated before any substantial physical disintegration of the particles.

19. A process as in claim 18 in which the treated coconut is mechanically disintegrated to form a slurry.

20. A process as in claim 12 in which the meat is in the form of pieces and in which the time period of acid treatment is terminated before the cores of the pieces have been cell disrupted.

21. A process as in claim 12 in which some coconut flavoring is removed before acid treatment and is returned to the product after acid treatment.

22. A process as in claim 12 in which the meat is in the form of pieces and coloring applied to the acid treated pieces with absorption only in the exterior surface layers of the same.

23. A process as in claim 13 in which the meat after said acid treatment is contacted with an alkali solution for neutralizing residual acid.

24. A process as in claim 13 in which hydration of the desiccated coconut is carried out as a separate step at a temperature from 85° to 220°F. and some water and fat removed froom the batch before the acid treatment.

25. In a process for the treatment of coconut meat that is characterized by aligned rod-like cells arranged in cell bundles, the steps of subjecting the coconut meat in moist condition with an acid-water solution of a physiologically acceptable acid at a temperature of the order of 180° – 250°F. and at pH 2 to 0.57 for a period of time of at least 5 minutes to cause disruption of cells and destruction of cell bundles and reorientation of disrupted cells to form a relatively absorbent material, and then further treating the material by neutralizing said acid to retard continued disruption of cells and destruction of cell bundles and dewatering.

26. A food product produced by the process of claim 1.

27. A food product produced by the process of claim 11.

28. A food product produced by the process of claim 25.

* * * * *